US012081535B2

(12) United States Patent
Iasynetskyi et al.

(10) Patent No.: US 12,081,535 B2
(45) Date of Patent: Sep. 3, 2024

(54) VEHICLE INTEGRATION PLATFORM (VIP) SECURITY INTEGRATION

(71) Applicant: Uber Technologies, Inc., San Francisco, CA (US)

(72) Inventors: Andrii Iasynetskyi, Millbrae, CA (US); Matthew Charles Ellis Wood, Pittsburgh, PA (US); Mark Yen, San Francisco, CA (US); Meenakshi Vohra, Cupertino, CA (US); Roman Kuzmenko, San Jose, CA (US)

(73) Assignee: Uber Technologies, Inc., San Francisco, CA (US)

( * ) Notice: Subject to any disclaimer, the term of this patent is extended or adjusted under 35 U.S.C. 154(b) by 164 days.

(21) Appl. No.: 17/328,152

(22) Filed: May 24, 2021

(65) Prior Publication Data
US 2021/0336948 A1 Oct. 28, 2021

Related U.S. Application Data

(63) Continuation of application No. 16/557,084, filed on Aug. 30, 2019, now Pat. No. 11,019,052.
(Continued)

(51) Int. Cl.
*H04L 9/40* (2022.01)
*G05D 1/00* (2006.01)
(Continued)

(52) U.S. Cl.
CPC ....... *H04L 63/0823* (2013.01); *G05D 1/0022* (2013.01); *G05D 1/0027* (2013.01);
(Continued)

(58) Field of Classification Search
CPC .............. H04L 63/0823; H04L 9/0825; H04L 2209/84; H04L 67/565; H04L 9/3263;
(Continued)

(56) References Cited

U.S. PATENT DOCUMENTS

| 10,375,077 B1 * | 8/2019 | Sokolov ............. G06F 21/6245 |
| 11,012,495 B1 * | 5/2021 | Vakalapudi ........... H04L 9/3263 |

(Continued)

FOREIGN PATENT DOCUMENTS

| EP | 3949253 | 4/2023 |
| WO | 2020198311 | 10/2020 |

OTHER PUBLICATIONS

International Search Report and Written Opinion for Application No. PCT/US2020/024637, dated Jun. 15, 2020, 11 pages.
(Continued)

*Primary Examiner* — Abdalla A Khaled
(74) *Attorney, Agent, or Firm* — Schwegman Lundberg & Woessner

(57) ABSTRACT

Systems and methods are directed to improvements for secure communications between client systems and a vehicle integration platform associated with a service provider entity. In one example, a communication infrastructure is provided which includes a vehicle integration platform that includes a plurality of application programming interfaces configured to facilitate communication among clients. The communication infrastructure includes a security integration system which is configured to receive and validate a client certificate forwarded to the vehicle integration platform from a client and determine an identity of the client and an origin of a request associated with the client certificate. The security integration system is configured to generate a certificate signing request associated with the client certificate based in part on the identity of the client and obtain an operational certificate for the client based in part on the certificate signing request to establish ability for client authentication within the vehicle integration platform.

17 Claims, 8 Drawing Sheets

Related U.S. Application Data

(60) Provisional application No. 62/823,300, filed on Mar. 25, 2019.

(51) Int. Cl.
  H04L 9/08 (2006.01)
  H04W 4/48 (2018.01)

(52) U.S. Cl.
  CPC ......... G05D 1/0055 (2013.01); H04L 9/0825 (2013.01); H04W 4/48 (2018.02); *H04L 2209/84* (2013.01)

(58) Field of Classification Search
  CPC ... H04L 9/0897; H04L 9/3247; G05D 1/0022; G05D 1/0027; G05D 1/0055; H04W 4/48; H04W 4/44; H04W 12/069; H04W 12/108; G06F 21/33; G06F 21/44
  See application file for complete search history.

(56) References Cited

U.S. PATENT DOCUMENTS

| | | | |
|---|---|---|---|
| 11,019,052 | B2 | 5/2021 | Iasynetskyi et al. |
| 11,246,032 | B1* | 2/2022 | Maass ................ H04W 12/71 |
| 11,341,849 | B2* | 5/2022 | Troia ............... G08G 1/096783 |
| 2010/0031025 | A1* | 2/2010 | Zhang ................ H04L 63/0823 713/156 |
| 2016/0087804 | A1* | 3/2016 | Park ...................... H04L 9/3268 713/156 |
| 2016/0099934 | A1* | 4/2016 | Logue ................... H04L 9/3265 713/168 |
| 2017/0236343 | A1* | 8/2017 | Leboeuf .............. H04W 12/069 340/5.61 |
| 2018/0013211 | A1* | 1/2018 | Ricci ...................... H02J 7/0068 |
| 2018/0242385 | A1* | 8/2018 | Chandramouli ........ H04W 4/44 |
| 2019/0370699 | A1* | 12/2019 | Chaplow .............. H04L 63/0823 |
| 2020/0275246 | A1* | 8/2020 | Croft ...................... H04W 4/70 |
| 2020/0314089 | A1 | 10/2020 | Iasynetskyi et al. |
| 2021/0058396 | A1* | 2/2021 | Nathanson ........... H04L 9/3268 |
| 2021/0112407 | A1* | 4/2021 | Shin ....................... G06F 21/44 |
| 2021/0320790 | A1* | 10/2021 | Nishimura ........... H04L 9/0897 |
| 2021/0334560 | A1* | 10/2021 | Troia .................... G07C 5/008 |
| 2021/0359845 | A1* | 11/2021 | Troia ...................... G07C 9/28 |

OTHER PUBLICATIONS

"International Application Serial No. PCT US2020 024637, International Preliminary Report on Patentability dated Oct. 7, 2021", 8 pgs.

"European Application Serial No. 20719307.9, Response to Communication persuant to Rules 161 and 162 filed May 13, 2022", 14 pgs.

* cited by examiner

VEHICLE INTEGRATION PLATFORM (VIP) SECURITY INTEGRATION

PRIORITY CLAIM

The present application is a continuation of U.S. patent application Ser. No. 16/557,084 filed on Aug. 30, 2019, which is based on and claims the benefit of U.S. Provisional Application No. 62/823,300 having a filing date of Mar. 25, 2019 both of which are incorporated by reference herein in their entirety for all purposes.

FIELD

The present disclosure relates generally to autonomous vehicles. More particularly, the present disclosure relates to systems and methods that provide for a secure communication infrastructure associated with a vehicle integration platform for autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

More particularly, an entity (e.g., service provider, owner, manager) can use one or more vehicles (e.g., ground-based vehicles, etc.) to provide a vehicle service such as a transportation service (e.g., rideshare service), a courier service, a delivery service, etc. The vehicle(s) can be autonomous vehicles that include various systems and devices configured to control the operation of the vehicle.

SUMMARY

Aspects and advantages of embodiments of the present disclosure will be set forth in part in the following description, or can be learned from the description, or can be learned through practice of the embodiments.

One example aspect of the present disclosure is directed to a communication infrastructure. The communication infrastructure includes a vehicle integration platform which includes a plurality of application programming interfaces configured to facilitate message communication among clients. The communication infrastructure includes a security integration system. The security integration system is configured to receive and validate a client certificate forwarded to the vehicle integration platform from a client. The security integration system is configured to determine an identity of the client and an origin of a request associated with the client certificate. The security integration system is configured to generate a certificate signing request associated with the client certificate based in part on the identity of the client. The security integration system is configured to obtain an operational certificate for the client based in part on the certificate signing request to establish an ability for client authentication within the vehicle integration platform.

Another example aspect of the present disclosure is directed to a computer-implemented method for facilitating secure communications between a client and a vehicle integration platform. The method includes receiving, by a computing system comprising one or more computing devices, a client certificate forwarded to the vehicle integration platform by the client. The method further includes validating, by the computing system, the client certificate. The method further includes determining, by the computing system, an identity of the client and an origin of a request associated with the client certificate. The method further includes generating, by the computing system, a certificate signing request associated with the client certificate based in part on the identity of the client. The method further includes obtaining, by the computing system, an operational certificate for the client based in part on the certificate signing request to establish an ability for client authentication within the vehicle integration platform.

Another example aspect of the present disclosure is directed to a computing system. The computing system includes one or more processors and one or more memories including instructions that, when executed by the one or more processors, cause the one or more processors to perform operations. The operations include receiving a client certificate forwarded to the vehicle integration platform by a client. The operations further include validating the client certificate. The operations further include determining an identity of the client and an origin of a request associated with the client certificate. The operations further generating a certificate signing request associated with the client certificate based in part on the identity of the client. The operations further obtaining an operational certificate for the client based in part on the certificate signing request to establish an ability for client authentication within the vehicle integration platform. The operations further signing messages from the client based on the operational certificate.

Another example aspect of the present disclosure is directed to a system that includes a plurality of clients operated by one or more entities, a gateway system, a vehicle integration platform, a secure storage system, a licensing service system, and a security integration system. The gateway system is configured to receive a message from one of the plurality of clients and forward the message to a security integration system. The gateway system is further configured as a transport layer security end point for communications between the plurality of clients and a service provider infrastructure. The vehicle integration platform includes a plurality of application programming interfaces configured to facilitate message communication among the plurality of clients. The secure storage system is configured to store one or more stub device certificates, a stub device certificate being associated with one of the plurality of clients. The licensing service system is configured to generate an operational certificate for one of the plurality of clients based on a certificate signing request. The security integration system includes one or more middleware layers implemented between the gateway system and the vehicle integration platform. In some implementations, the one or more middleware layers are configured for use by all of the plurality of clients. In other implementations, at least one middleware layer is provided separately for each of the plurality of clients. The security integration system is configured to obtain the received message from the gateway system, the received message including a client certificate associated with the one of the plurality of clients. The security integration system is also configured to validate the client certificate. The security integration system is also configured to determine an identity of the client and an origin of the message associated with the client certificate. The security integration system is also configured to obtain a stub device certificate from the secure storage system based in part on the identity of the client. The security integration system is also configured to generate a certificate signing request associated with the client based at least in part on the received stub device certificate associated with the client. The security integration system is also configured to provide the certificate signing request associated with the client to the licensing service system. The security integration system is also configured to obtain an operational certificate associated the client from the licensing service system in response to the certificate signing request, the operational certificate establishing an ability for client authentication within the vehicle integration platform. The security integration system is also configured to sign the message from the client based on the operational certificate prior to forwarding the signed message to a public platform system of the vehicle integration platform.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
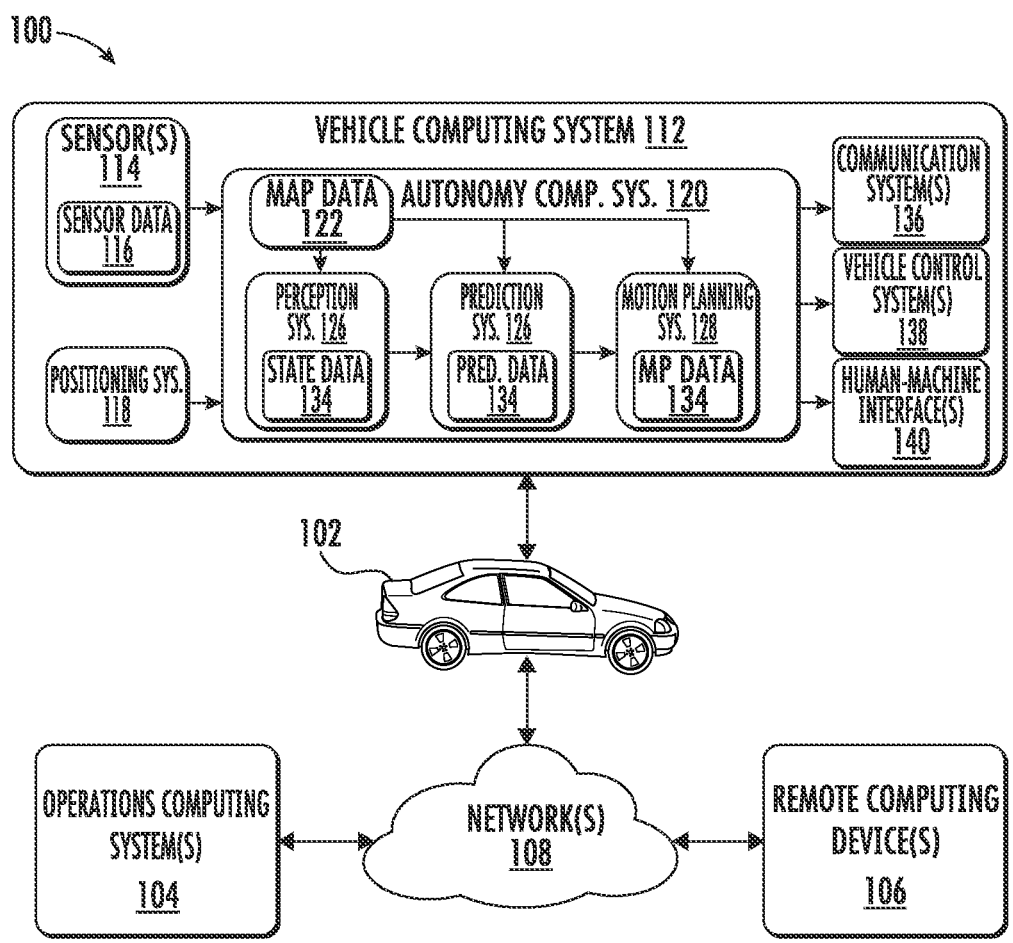
FIG. 1 depicts a block diagram of an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing improvements for secure communications between client systems and a vehicle integration platform (VIP) associated with a service provider entity. As disclosed herein, a VIP can provide for a security integration system having a multi-layered architecture which can unify approaches to security for first-party clients (e.g., service provider clients) and third-party clients (e.g., vendor clients) and provides for end-to-end security continuously from a vendor vehicle to a service provider infrastructure and vice versa. The vehicle integration platform can include, for example, a plurality of application programming interfaces configured to facilitate message communication among clients. Third-party clients of a VIP can include autonomous vehicles associated with one or more respective vendors and/or one or more server computing systems associated with one or more respective vendors, while first-party clients can include autonomous vehicles associated with an entity (e.g., a service provider) and/or one or more server computing systems and/or system clients associated with an entity (e.g., a service provider) configured to host and/or operate with the VIP. Various first-party and/or third-party clients can be integrated with the VIP for purposes of coordinating implementation of one or more services (e.g., vehicle-based transportation services, etc.) across different parties, geographic locations, and/or the like. In particular, a VIP security integration system can implement end-to-end message signing to ensure that clients and systems within and/or associated with a VIP can identify entities in communication with the VIP and validate that messages are communicated from/to entities that are authorized to operate with the service provider.

A VIP security topology can provide a multi-layered architecture comprising a service provider licensing service (e.g., public key infrastructure that issues certificates); transport layer security (e.g., between third-party server and service provider server, autonomous vehicle and service provider server, etc.), for example, based on authentication using short-lived certificates; and message level security, for example, provided by a VIP security integration system. A VIP security integration system can provide a flexible way for mitigating issues associated with tenancy of multiple vendors on a VIP where vendor vehicles and/or server computing systems may have different capabilities, safety, and security requirements. For instance, in various implementations, a VIP security integration system can address challenges associated with: different modes of integration with a VIP such as vehicle-to-server-to-server, vehicle-to-server, vehicle-to-internal server-to-public server, and the like; different vendor server architectures (e.g., dictating how a vendor implements security); and/or a vendor inability to implement service provider recommended security architecture with regard to message signing (e.g., a security architecture onboard a vehicle, a security architecture on a vendor server, etc.).

In particular, a public VIP system may comprise a weak spot at the edge of the service provider network (e.g., a VIP gateway, etc.) where the mutual transport layer security (mTLS) between a client and the VIP terminates, such that the public VIP system has no verifiability over the validity of an incoming message being sent from the service provider network edge (e.g., VIP gateway, etc.) and/or where the message originates from (e.g., the vehicle communicating the message to the VIP).

As such, according to aspects of the present disclosure, a VIP security integration system can provide for end-to-end message signing to improve vendor integration and mitigate security risks associated with a multi-vendor topology. The VIP security integration system can facilitate processing and validating a client certificate obtained from the VIP gateway (e.g., network edge where TLS terminates). The VIP security integration system can determine the identity of a vendor and the origin of the request (e.g., message). The VIP security integration system can obtain specific vendor security configuration data based on the vendor identity (e.g., determine if the vendor supports message signing, etc.). The VIP security integration system can then determine how to handle messages to be provided to the public VIP based on the vendor security configuration data. In some implementations, the VIP security integration system can be implemented in front of the public VIP. Alternatively, in some implementations, the VIP security integration system can be comprised within the public VIP.

In particular, according to aspects of the present disclosure, in some implementations, a VIP can comprise a VIP security integration system implemented between a VIP gateway (e.g., service provider network edge, etc.) and a public VIP system. In some implementations, the VIP security integration system can include one or more middleware layers provided between such networked components of the VIP. When the VIP gateway receives a message comprising a client certificate (e.g., TLS certificate, etc.), for example, from a vendor computing system, the VIP gateway forwards the message to the VIP security integration system. The VIP security integration system can determine the vendor identity from the client certificate and obtain vendor specific security configuration data. Based on the vendor specific security configuration data, the VIP security integration system can determine whether the vendor system supports message signing. If the vendor system supports message signing, the VIP security integration system can forward signed messages from the client to the public VIP system to be provided to one or more service provider system clients and handled as appropriate. If the vendor system does not support message signing, the VIP security integration system can request a "stub" device certificate for the client, for example, from a secure storage system comprised within the VIP. In some implementations, a "stub" device certificate can be generated for a client during a client provision process at the VIP (e.g., a VIP provision service system) for a vendor system that does not provide vehicle device certificates for message signing (e.g., the vendor system does not support message signing) and the "stub" device certificate can be stored, along with a corresponding private key, in a secure storage system comprised within the VIP which is associated with the VIP security integration system and/or a service provider licensing service system. After obtaining the "stub" device certificate for the client, the VIP security integration system can generate a certificate signing request (CSR) and provide the CSR to a service provider licensing service system (e.g., using a certificate issuing protocol such as but not limited to Simple Certificate Enrollment Protocol (SCEP)). The service provider licensing service system identifies that the certificate is associated with a trusted authority (e.g., client that is authorized to operate with the service provider infrastructure/VIP) and returns an operational certificate and corresponding key for the client to the VIP security integration system. In some embodiments, for example, an operational certificate can include a universally unique identifier (UUID) descriptive of a client/vehicle identity embedded within it. The VIP security integration system can then use the operational certificate to sign messages from the client before forwarding the messages to the public VIP system. The public VIP can then validate the signature of the signed message before forwarding the message to one or more service provider system clients for handling as appropriate.

According to another aspect of the present disclosure, in some implementations, a VIP can comprise a VIP security integration system implemented between a VIP gateway and a public VIP system (such as described above), as well as a VIP licensing service proxy and service provider licensing service system implemented downstream of the VIP security integration system behind the VIP gateway. The VIP licensing service proxy relays SCEP requests from the VIP security integration system to the service provider licensing service system. Such implementations can eliminate the need for a third-party vendor to integrate with the licensing service system and can provide clear separation between external third-party vendor implementation and the service provider infrastructure by standardizing authentication flow and schemes and by removing the need from a third-party vendor to maintain additional communication protocols with the licensing service. In addition, such implementations can enable increased flexibility with regard to changing the licensing service (e.g., PKI infrastructure, etc.), changing communication channels and/or protocol definitions, modifying authentication (AuthN) and/or authorization (AuthZ) schemes based on new requirements, and/or the like without requiring third-party vendor migration. In some implementations, the VIP can also abstract and implement better error handling for licensing service integration. In some implementations, the VIP licensing service proxy can translate a service provider protocol to a protocol required by the licensing service.

According to another aspect of the present disclosure, in some implementations, a VIP can comprise vendor-specific VIP security gateways (e.g., comprising a VIP security integration system) implemented between a VIP gateway and a public VIP system. In such implementations, when the VIP gateway receives a message from a vendor, the VIP gateway forwards the message to the appropriate vendor-specific VIP security gateway. If the vendor provides for message signing, the vendor-specific VIP security gateway can verify the signature of the message and forward the message to the public VIP system to be handled as appropriate. If the vendor does not support message signing, the vendor-specific VIP security gateway can request a "stub" device certificate for the client, for example, from a secure storage system comprised within and/or associated with the VIP. After obtaining the "stub" device certificate for the client, the vendor-specific VIP security gateway can generate a certificate signing request (CSR) and provide the CSR to a service provider licensing service system (e.g., using SCEP). The service provider licensing service system identifies that the certificate is associated with a trusted authority and returns an operational certificate and corresponding key to the vendor-specific VIP security gateway (e.g., with the operational certificate comprising a vehicle identity (UUID) embedded within it). The vendor-specific VIP security gateway can then use the operational certificate to sign messages from the client before forwarding the messages to the public VIP system. The public VIP can then validate the signature of the signed message before forwarding the message to one or more service provider system clients to be handled as appropriate.

In such implementations, the vendor-specific VIP security gateway can isolate any specific security risk (e.g., associated with a vendor configuration/architecture, etc.) to a dedicated system. Vendor-specific VIP security gateways can compartmentalize security and/or authentication related changes such that, for example, changes for a specific vendor will not require a full re-evaluation of all vendors and all authentication schemes to ensure there is no additional exposure across the entire VIP.

In some implementations, the vendor-specific VIP security gateways can be externalized to the service provider network edge (e.g., VIP gateway, etc.) such that end-to-end trust can be established (e.g., using TLS, etc.) from the vendor to the vendor-specific VIP security gateway and from the vendor-specific VIP security gateway directly to the public VIP.

According to another aspect of the present disclosure, a device certificate can represent a specific entity, such as, for example, a vehicle, a drone, a vendor server, and/or the like. A device certificate contains additional information about that specific entity that somehow identifies it. A device certificate can be long-lived and can be stored in a hardware or software trusted platform module (TPM) associated with the specific entity. A device certificate cryptographic identity (e.g., SHA-256 fingerprint or another identifier stored in the certificate) can be used as an index in a service provider system and can be used to associate the specific entity with a vehicle universally unique identifier (UUID).

An operational certificate can grant access to the VIP, for example, via mutual TLS (e.g., server scenario) or can be used to perform a specific action, such as message signing (e.g., vehicle scenario). An operational certificate can be short-lived, for example, issued for 24 hours by a licensing service and can be used by vehicles and/or vendor server computing systems.

According to another aspect of the present disclosure, the disclosed technology can provide for client provisioning in association with the VIP. Client (e.g. vehicle) provisioning may include providing a client (e.g., vehicle) device certificate to the VIP (e.g., a VIP provision service API, etc.). In some implementations, the device certificate and a corresponding private key may be created once per client (e.g. vehicle) and stored in a hardware or software trusted platform module (TPM) associated with the vehicle. The VIP provision service may validate the device certificate and store a device certificate fingerprint (e.g., SHA-256 fingerprint, etc.) and client (e.g., vehicle) data in association with a platform service. In some implementations, a vehicle universally unique identifier (UUID) may be associated with the device certificate and issued during vehicle licensing.

In some implementations, client provisioning may be based on third-party requirements and/or security configurations. As part of client provisioning, a third-party vendor (e.g., vendor server computing system, etc.) may provide a client device certificate to the VIP (e.g., a VIP provision service API, etc.). The VIP may provide for whitelisting the third-party vendor client device certificate in a VIP licensing service. In some implementations, the device certificate and a corresponding private key may be created once per client (e.g. vehicle) and stored in a hardware or software TPM associated with the vehicle. The VIP provision service may validate the device certificate and store a device certificate fingerprint (e.g., SHA-256 fingerprint, etc.) and client (e.g., vehicle) data in association with a platform service. In some implementations, a vehicle universally unique identifier (UUID) may be associated with the device certificate and issued during vehicle licensing.

In some implementations, a vehicle device certificate may expire and be rotated by a third-party vendor such that use of a permanent certificate fingerprint may not be possible. For example, a previously computed and stored certificate fingerprint would become invalid after expiration/rotation of the device certificate by the third-party vendor. Additionally, in some implementations, the VIP may not know what unique identifier is being used by a third-party vendor and where the identifier is located within the certificate body.

As one alternative to resolve such issues, in some implementations, the VIP may provide for a per vendor static security configuration. For example, during initial onboarding a third-party vendor can provide the format and location of its vehicle identifiers in a device certificate to be used in association with the VIP. The vendor identifier format and location data can be stored as part of static configuration data for the vendor in the VIP. The vendor static configuration data can then be used in the vehicle provisioning process in the VIP. The use of a per vendor static security configuration can allow for decoupling the VIP provisioning vehicle identification for a third-party vendor provision process. Additionally, even if a device certificate is expired or rotated by a vendor, a one-to-one mapping of a vendor vehicle identifier to a vehicle entity within the VIP is still provided as long as the vendor vehicle identifier remains unchanged.

As another alternative to resolve such issues, in some implementations, the VIP may provide for certificate fingerprint rotation. In such implementations, the VIP may provide for mapping the relationship between a vehicle UUID within the service provider system and all valid certificate fingerprints. For example, the VIP (e.g., VIP provision service, etc.) may provide for invalidating expired fingerprints based on an expiration date from the device certificate and provide for whitelisting new device certificates for the vehicle. Such implementations can provide for standardizing vehicle identifiers across all third-party vendors within the service provider system and may not expose vehicle identifiers in the public certificate. Additionally, such implementations can provide indirect mapping between a device certificate and a service provider system vehicle identifier.

According to another aspect of the present disclosure, the disclosed technology can provide for client licensing in association with the VIP. In some embodiments, client (e.g., vehicle) licensing may be originated onboard a vehicle. Vehicle licensing may be initiated by a vehicle (e.g., via a vendor server computing system, etc.) sending a request to a service provider licensing service certificate authority, for example using simple certificate enrollment protocol (SCEP). The vehicle may generate a certificate signing request (CSR) and sign the CSR using its device certificate private key. The vehicle then sends the signed CSR to the licensing service, for example, using SCEP. The licensing service can obtain validation of the vehicle identity, for example, by sending a validation request including the vehicle's device certificate to a VIP provision service. The VIP provision service can validate the vehicle identity and provide the vehicle UUID to the licensing service. The licensing service then generates an operational certificate and provides the operational certificate to the vehicle. In some embodiments, the operational certificate may be valid for a limited duration, for example, expiring after 24 hours. The vehicle can then use the operational certificate to sign messages being communicated to the VIP.

In some implementations, licensing for autonomous vehicles associated with the service provider may be initiated upon a secure start of the vehicle. For example, upon a secure start using credentials stored in a secure storage system, the service provider vehicle may generate a CSR and provide the CSR to the service provider licensing service to obtain operational certificates and the operational certificate private keys. In some implementations, service provider vehicles may connect directly to the VIP (e.g., as opposed to connecting to the VIP gateway via a vendor server computing system) and thus each service provider vehicle requires a unique transport layer security (TLS) certificate to establish communication with the VIP. In such implementations, during vehicle licensing, the service provider vehicle obtains both an operational TLS certificate and an operational message signing certificate. In some implementations, a service provider vehicle device certificate may contain a vehicle UUID and a vehicle alias. Additionally, in some implementations, some third-party vendor vehicles may communicate directly with the VIP as opposed to communicating via a third-party vendor server computing system, and thus, will require both an operational TLS certificate and an operational message signing certificate to securely communicate with the VIP.

With more particular reference to the VIP, such component can facilitate secure, bidirectional communications between autonomous vehicles and/or server computing systems associated with a plurality of entities (e.g., clients) and a provider infrastructure such as, for example, a service provider's operations system (e.g., including a data center). To do so, the provider infrastructure can include a platform comprising one or more application programming interfaces (APIs) that are configured to allow autonomous vehicles and/or server computing systems associated with one or more entities and one or more provider infrastructure endpoints (e.g., system clients, etc.) to efficiently communicate. In some implementations, communication via the VIP can be for purposes of coordinating implementation of one or more services (e.g., vehicle-based transportation services such as ride-share services, delivery services, courier services, etc.) across different parties, geographic locations, and/or the like. In the example of a vehicle-based transportation service, third-party clients can communicate with the VIP in addition to first-party clients so that all such clients can accept service-related assignments managed by the service provider.

In particular, the systems and methods of the present disclosure can provide one or more platforms to facilitate and manage communications between autonomous vehicles and/or server computing systems associated with a plurality of entities (e.g., clients) and one or more backend systems of a service entity. For example, a service provider infrastructure can include a "public" platform and a "private" platform which can facilitate communication between clients and one or more service provider infrastructure endpoints to provide for facilitating services provided by autonomous vehicles.

As a further example, the public platform associated with the service provider infrastructure can facilitate communication between the service provider infrastructure and autonomous vehicles associated with the service provider, as well as between the service provider infrastructure and one or more other entities (e.g., third-party entities (other than the service provider) managing autonomous vehicle fleets, etc.). The public platform can allow for services-related communication (e.g., trip services, routing services, etc.) between the service provider infrastructure and the autonomous vehicles and/or other entity system(s) (e.g., third-party entity systems managing autonomous vehicle fleets). Additionally, the private platform associated with the service provider infrastructure can facilitate communication between the service provider infrastructure and autonomous vehicles associated with the service provider. The private platform can allow for communication associated with the service provider autonomous vehicle-specific services (proprietary/internal services) in the service provider infrastructure (e.g., fleet management, remote autonomy assistance, etc.) between the service provider infrastructure and the autonomous vehicles of the service provider.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the entity to provide the vehicle service can be associated with a fleet of the entity or a third party. For example, the entity (e.g., the service provider) may own, lease, etc. a fleet of autonomous vehicles that can be managed by the entity (e.g., the system clients) to provide one or more vehicle services. An autonomous vehicle utilized to provide the vehicle service(s) can be included in this fleet of the entity. In some implementations, an autonomous vehicle can be associated with a third party such as, for example, an individual, an original equipment manufacturer (OEM), or another entity. Even though such an autonomous vehicle may not be included in the fleet of autonomous vehicles of the entity, the platforms of the present disclosure can allow the autonomous vehicle to still be utilized to provide the vehicle services offered by the entity, access its system clients, etc.

According to an aspect of the present disclosure, a provider entity infrastructure can include a public platform and a private platform to facilitate services between the provider entity infrastructure and autonomous vehicles and/or server computing systems associated with one or more entities (e.g., associated with the provider, associated with third party vendors, etc.). The public platform can facilitate access to provider services by autonomous vehicles associated with the provider and by autonomous vehicles and/or server computing systems associated with one or more third party vendors. The public platform can provide access to provider services such as trip assignment services, routing services, supply positioning services, payment services and/or the like. The private platform can provide access to provider services that are specific to the provider autonomous vehicle fleet such as fleet management services, assistance services, and/or the like. Both the public platform and the private platform each include a Gateway API to facilitate communication from the autonomous vehicles and/or entity server computing systems to the provider backend infrastructure services (e.g., backend system clients, etc.) and a Vehicle API to facilitate communication from the provider backend infrastructure services to the autonomous vehicles and/or entity server computing systems. Each of the platform's APIs can have separate responsibilities, monitoring, alerting, tracing, service level agreements (SLAs), and/or the like.

For example, the public platform Gateway API can abstract the provider infrastructure from the provider autonomous vehicles and third party vendor autonomous vehicles and/or server computing systems and facilitate requests from the provider autonomous vehicles and third party vendor autonomous vehicles and/or entity server computing systems to communicate with the provider backend infrastructure. The public platform Vehicle API can abstract the provider autonomous vehicles and third party vendor autonomous vehicles and/or server computing systems from the provider infrastructure and facilitate requests from the provider infrastructure backend services to communicate with the provider autonomous vehicles and third party vendor autonomous vehicles and/or entity server computing systems. The private Gateway API can abstract the provider infrastructure from the provider autonomous vehicles and facilitate requests from the provider autonomous vehicles to communicate with the provider backend infrastructure. The private platform Vehicle API can abstract the provider autonomous vehicles from the provider infrastructure and facilitate requests from the provider infrastructure backend services to communicate with the provider autonomous vehicles.

More particularly, the platforms can be logically consolidated points of ingress and egress of all communications from and/or to the autonomous vehicles (and/or third party vendor computing systems systems) and a service provider infrastructure. Moreover, the platforms can be logical constructs that contain all vehicle and/or service facing interfaces. For example, the platform can include a plurality of backend interfaces. Each backend interface can be associated with at least one service provider system client. A service provider system client can be the hardware and/or software implemented on a computing system (e.g., of the service provider) that is remote from the autonomous vehicle and that provides a particular back-end service to an autonomous vehicle (e.g., scheduling of vehicle service assignments, routing services, etc.). A backend interface can be the interface (e.g., a normalized interface) that allows one application and/or system (e.g., of the autonomous vehicle and/or third party vendor computing system) to provide data to and/or obtain data from another application and/or system (e.g., a service provider system client). Each backend interface can have one or more functions that are associated with the particular backend interface. The autonomous vehicle and/or third party vendor computing system can provide a communication to the platform to call a function of a backend interface. In this way, the backend interfaces can be an external facing edge of the service provider infrastructure that is responsible for providing a secure tunnel for a vehicle and/or other system to communicate with a particular service provider system client so that the vehicle and/or other system can utilize the backend service associated with that service provider system client, and vice versa.

The provider entity infrastructure can include an API proxy to act as a central gateway to the public platform as well as provide an API management platform to provide security, reliability, scalability, and abstraction for the backend services. For example, in some implementations, the API proxy can provide authentication and security (e.g., access control), throttling and/or rate limiting, caching, API management tools, schema validation, analytics, development tools, standardized logon and metrics, and/or the like.

In some implementations, the platforms can provide for chain-based certificates to provide security, whereby certificates are hierarchical and traceable. For example, chain-based certificates provide for certificate chaining to establish hierarchical chains of trust that extend to each vendor and to each of the vendor's autonomous vehicles. The chain-based model can allow for revoking a certificate for a single autonomous vehicle and for revoking a certificate for the entire vendor fleet.

The systems and methods described herein provide a number of technical effects and benefits. For instance, the systems and methods can provide end-to-end security integration for all actors and communication associated with a VIP. A VIP security integration system as disclosed herein can provide for a more consistent security implementation when integrating third-party vendors with a VIP. Such implementation consistency provides for reducing complexity as well as reducing risks of compromising entities that are involved in communications with a VIP. A VIP security integration system as disclosed herein can provide an additional benefit of allowing increased flexibility in dealing with varying third-party vendor requirements when integrating third-party vendors in a VIP.

The systems and methods described herein provide additional technical effects and benefits including allowing for tenancy of multiple vendor vehicles on the VIP with different capabilities, safety, and security requirements. Additional technical effects and benefits can include: allowing for different modes of integration, such as vehicle-to-server-to-server, vehicle-to-server, vehicle-to-internal server-to-public server, etc.; allowing for different third-party vendor server architectures; and/or the like.

The systems and methods of the present disclosure can provide an improvement to vehicle computing technology, such as autonomous vehicle computing technology and the remote computing systems associated therewith. For instance, the platforms, application programming interfaces, systems, and methods of the present disclosure provide a more secure end-to-end approach to communicating data to and/or from autonomous vehicles and computing systems remote from the autonomous vehicles (e.g., associated with a service provider VIP, etc.) by providing with reduced complexity. For example, the disclosed technology can assist in simplifying the authentication and licensing of clients (e.g., vehicle computing systems, vendor server computing systems, etc.), thereby reducing the processing and communication resources required to operate vehicles in association with a service provider system. Additionally the systems and methods of the present disclosure can provide an improvement to vehicle computing technology by reducing resources required to implement specific computing system security architectures and/or customize computing system security architectures to communicate with a service provider system.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include one or more identifiers associated with a vehicle, a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102, computing system 104, and/or remote computing devices 106.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the remote computing devices 106 can be associated with a third-party entity that is different that the entity associated with operations computing system 104. This can include, for example, a third-party vehicle manager, vendor, manufacturer, etc. that is associated with a fleet of third-party autonomous vehicles. In some implementations, the operations computing system 104 can include the one or more remote computing devices 106.

The vehicle 102 can be a ground-based vehicle (e.g., an automobile, truck, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, the state of an environment including one or more objects (e.g., the physical dimensions and/or appearance of the one or more objects), vehicle identifiers, and/or the like can be stored locally in one or more memory devices of the vehicle 102. Additionally, the vehicle 102 can provide data indicative of the state of the vehicle, the state of one or more passengers of the vehicle, vehicle identifiers, the state of an environment including one or more objects, and/or the like to the operations computing system 104, which can store an indication, record, and/or other data indicative of the state of the vehicle, the state of one or more passengers of the vehicle, the state of the one or more objects within a predefined distance of the vehicle 102, and/or the like in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel(s).

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
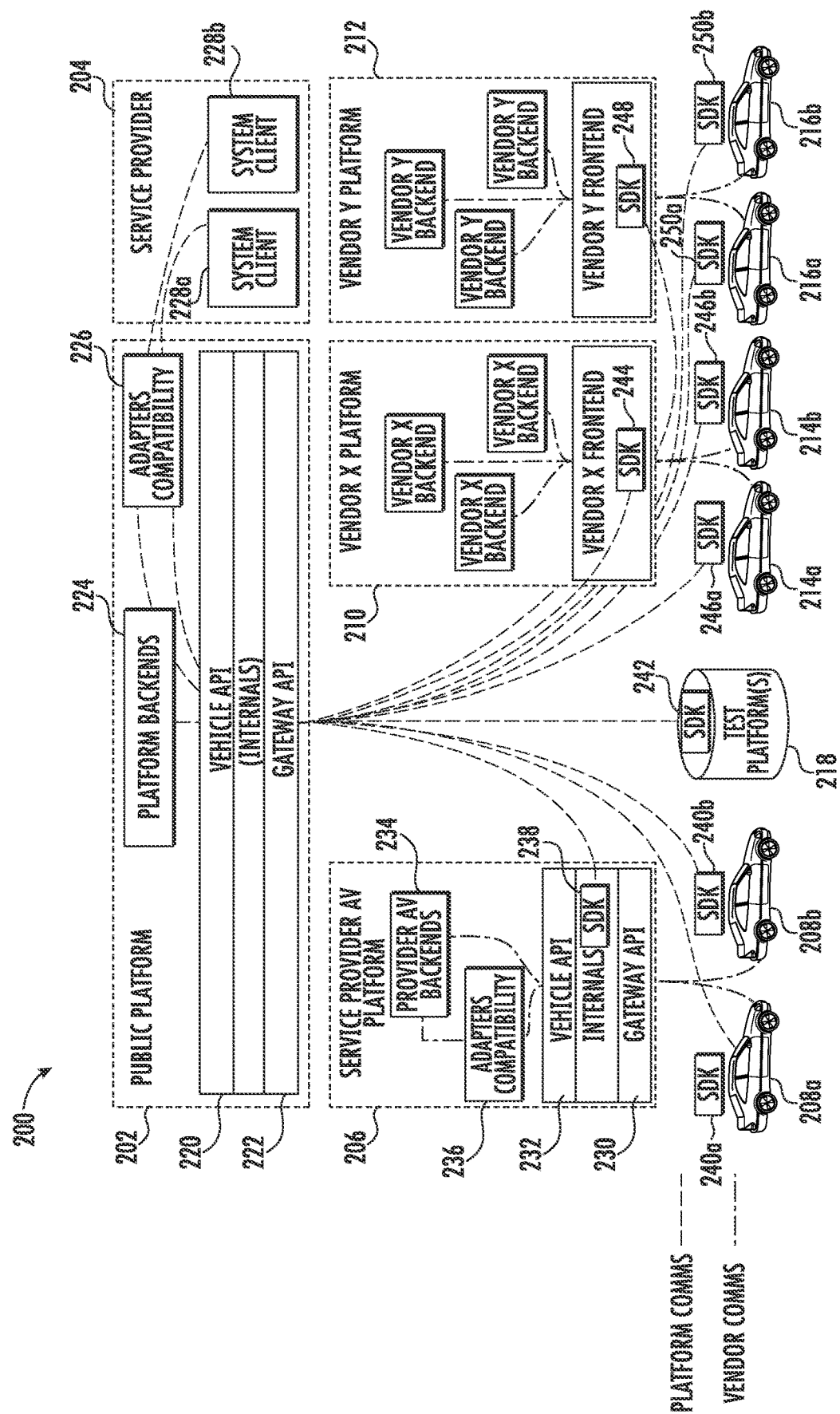
FIG. 2 depicts an example infrastructure system according to example embodiments of the present disclosure.

FIG. 2 depicts an example vehicle service infrastructure system 200 according to example embodiments of the present disclosure. As illustrated in FIG. 2, an example service infrastructure 200, according to embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b.

As described herein, a vehicle service infrastructure 200 can include a public platform 202 to facilitate vehicle services (e.g., provided via one or more system clients (228a, 228b) associated with a service provider operations computing system) between the service provider infrastructure system 204 (e.g., operations computing system, etc.) and vehicles associated with one or more entities (e.g., associated with the service provider (208a, 208b), associated with third-party entities (214a, 214b, 216a, 216b), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of vehicle services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. An autonomous vehicle can provide a communication to the public platform 202 to call a function of a backend interface. In this way, the backend interfaces can be an external facing edge of the service provider infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider operations computing system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider infrastructure system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provider infrastructure, and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider operations computing system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to provide access to.

Figure 3:
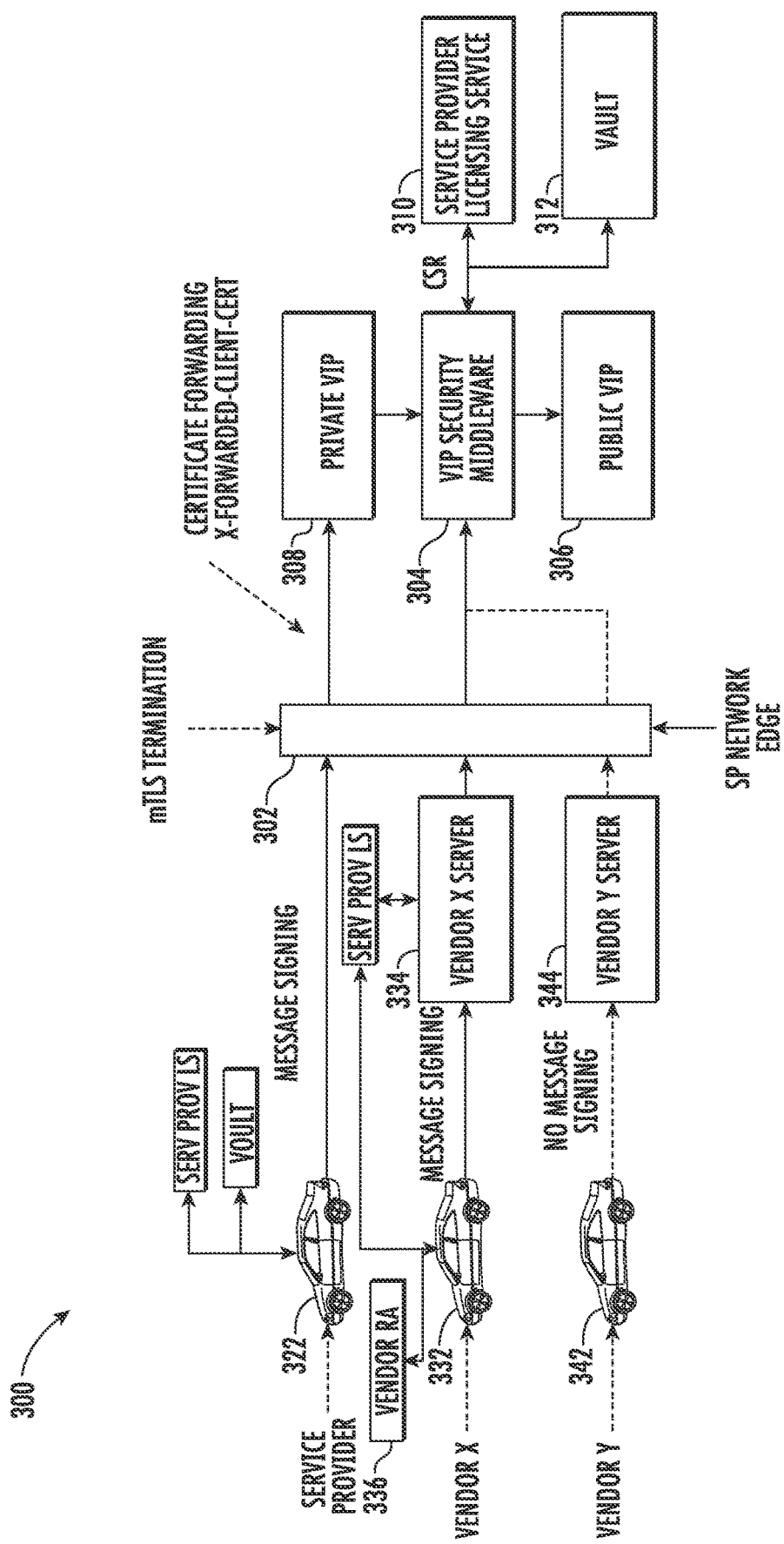
FIG. 3 depicts a first example of security integration for an infrastructure system according to example embodiments of the present disclosure.

FIG. 3 depicts a first example of security integration 300 for a vehicle service infrastructure system according to example embodiments of the present disclosure. As disclosed herein, a VIP can provide for a security integration system having a multi-layered architecture which can unify approaches to security for first-party clients (e.g., service provider clients) and third-party clients (e.g., vendor clients) and provides for end-to-end security continuously from a vendor vehicle to a service provider infrastructure and vice versa. In particular, a VIP security integration system can implement end-to-end message signing to ensure that clients and systems within and/or associated with a VIP can identify entities in communication with the VIP and validate that messages are communicated from/to entities that are authorized to operate with the service provider.

As illustrated in FIG. 3, a security integration 300 for a vehicle service infrastructure system can include a VIP gateway 302 (e.g., service provider network edge, etc.), a VIP security integration system 304 (e.g., including security middleware layers, etc.), a public platform (e.g., public VIP) 306, and a private platform (e.g., private VIP) 308 as part of a vehicle service infrastructure system. Vehicles associated with a service provider (e.g., service provider vehicle(s) 322) as well as vehicles and/or clients associated with one or more third-party partners (e.g., vendor X vehicle(s) 332, vendor X server 334, vendor Y vehicle(s) 342, vendor Y server 344, etc.) can communicate with the vehicle service infrastructure system, for example, through VIP gateway 302.

As illustrated in FIG. 3, in some implementations, a vehicle service infrastructure system (e.g., VIP) can include a VIP security integration system 304 (e.g., VIP security middleware, etc.) implemented between a VIP gateway 302 (e.g., service provider network edge, etc.) and a public VIP system (e.g., public VIP 306) to provide for secure communication between client systems (e.g., service provider vehicle(s) 322, vendor X vehicle(s) 332, vendor X server 334, vendor Y vehicle(s) 342, vendor Y server 344, etc.) and the service provider operations systems (e.g., VIP, service provider back-end services, etc.). When the VIP gateway 302 receives a message comprising a client certificate (e.g., TLS certificate, etc.), for example, from a vendor computing system (e.g., vendor X server 334, vendor Y server 344, etc.), the VIP gateway 302 forwards the message to the VIP security integration system 304. The message from the vendor computing system (e.g., vendor X server 334, vendor Y server 344, etc.) can originate from a vehicle associated with the vendor (e.g., vendor X vehicle(s) 332, vendor Y vehicle(s) 342, etc.) and be associated with coordinating implementation of one or more services (e.g., vehicle-based transportation services such as ride-share services, delivery services, courier services, etc.).

The VIP security integration system 304 can determine the vendor identity from the client certificate and obtain vendor specific security configuration data. Based on the vendor specific security configuration data, the VIP security integration system 304 can determine whether the vendor system supports message signing. If the vendor system supports message signing (e.g., vendor X vehicle 332, vendor X server 334), the VIP security integration system 304 can forward signed messages from the client (e.g., vendor X server 334, vendor X vehicle 332) to the public VIP 306. The public VIP 306 can then validate the signature of the signed message before forwarding the message to one or more service provider system clients (e.g., back-end services, etc.) for handling as appropriate.

If the vendor system does not support message signing (e.g., vendor Y vehicle 342, vendor Y server 344), the VIP security integration system 304 can request a "stub" device certificate for the client, for example, from a secure storage system, such as vault 312, comprised within the VIP via a service provider licensing service 310. In some implementations, a "stub" device certificate can be generated for a client during a client provision process at the VIP (e.g., a VIP provision service system) for a vendor system that does not provide vehicle device certificates for message signing (e.g., vendor Y vehicle 342, vendor Y server 344) and the "stub" device certificate can be stored, along with a corresponding private key, in a secure storage system (e.g., vault 312) comprised within the VIP which is associated with the VIP security integration system 304 and/or a service provider licensing service system 310. After obtaining the "stub" device certificate for the client (e.g., vendor Y vehicle 342, etc.), the VIP security integration system 304 can generate a certificate signing request (CSR) and provide the CSR to a service provider licensing service system 310 (e.g., using a certificate issuing protocol such as but not limited to Simple Certificate Enrollment Protocol (SCEP)). The service provider licensing service system 310 identifies that the certificate is associated with a trusted authority (e.g., client that is authorized to operate with the service provider infrastructure/VIP) and returns an operational certificate and corresponding key for the client (e.g., vendor Y vehicle 342, etc.) to the VIP security integration system 304. In some embodiments, for example, an operational certificate can include a universally unique identifier (UUID) descriptive of a client/vehicle identity (e.g., vendor Y vehicle 342, etc.) embedded within it. The VIP security integration system 304 can then use the operational certificate to sign messages from the client (e.g., vendor Y vehicle 342, etc.) before forwarding the messages to the public VIP 306. The public VIP 306 can then validate the signature of the signed message before forwarding the message to one or more service provider system clients for handling as appropriate. In some implementations, an operational certificate can grant access to the VIP, for example, via mutual TLS (e.g., server scenario) or can be used to perform a specific action, such as message signing (e.g., vehicle scenario). An operational certificate can be short-lived, for example, issued for 24 hours by a licensing service, and can be used by vehicles and/or vendor server computing systems.

When the VIP gateway 302 receives a message from a vehicle associated with the service provider (e.g., service provider vehicle(s) 322), the VIP gateway can provide the message to the private VIP 308 or the public VIP 306 as appropriate (e.g., based on the type of communication, services requested, etc.). In some implementations, licensing for autonomous vehicles associated with the service provider (e.g., service provider vehicle(s) 322) may be initiated upon a secure start of the vehicle. For example, upon a secure start using credentials stored in a secure storage system (e.g., on-board the vehicle), the service provider vehicle 322 may generate a CSR and provide the CSR to the service provider licensing service 310 to obtain operational certificates and the operational certificate private keys.

In some implementations, a vendor (e.g. vendor X) may have an associated registration authority (RA), such as RA 336, which provides services related to security certificates for the vendor clients (e.g., vendor X vehicle(s) 336) and which may provide vendor security certificates (e.g., PKI infrastructure, etc.) to the service provider licensing service system 310 for use in authentication of the vendor clients.

Figure 4:
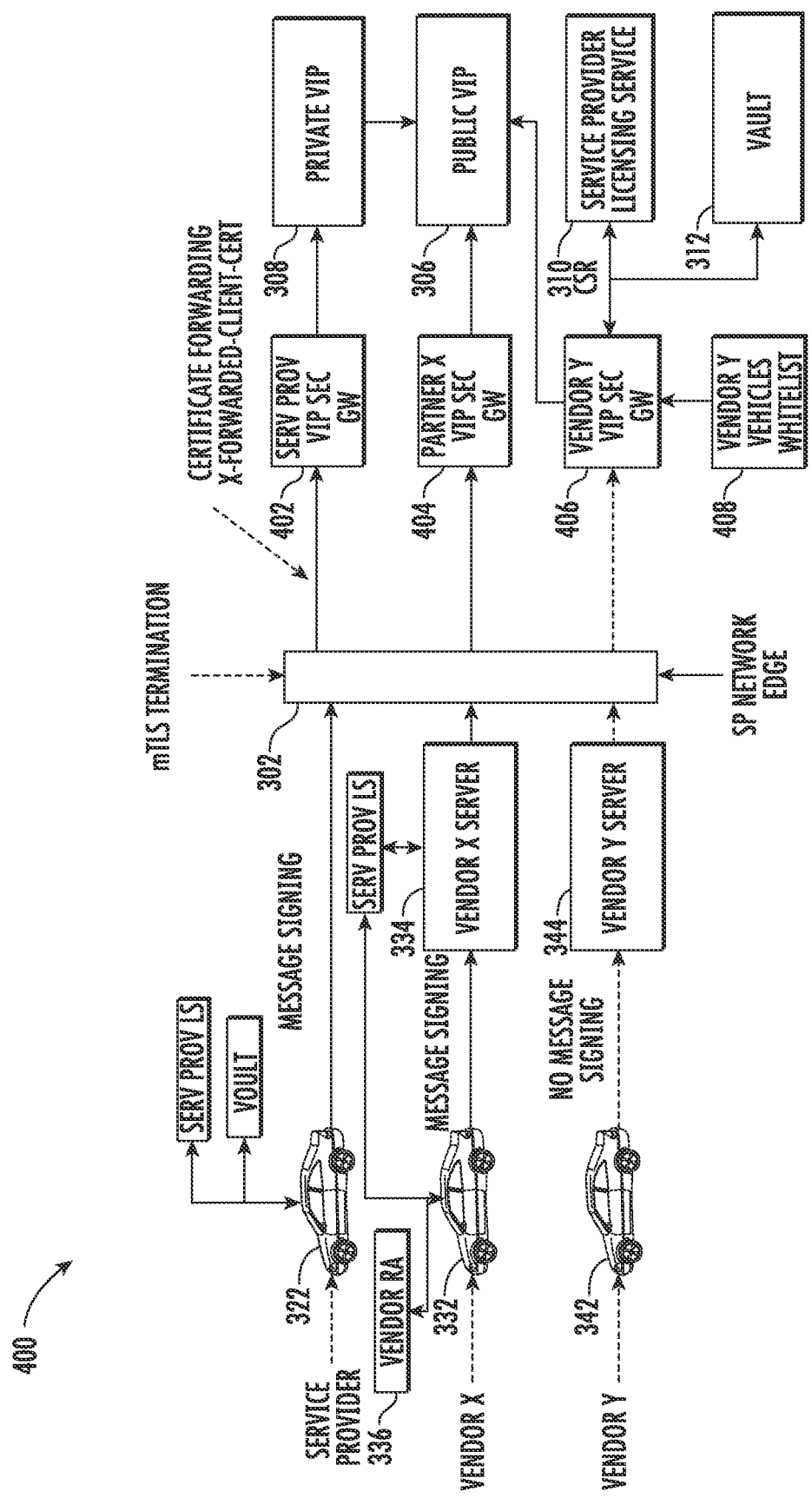
FIG. 4 depicts a second example of security integration for an infrastructure system according to example embodiments of the present disclosure.

FIG. 4 depicts a second example of security integration 400 for a vehicle service infrastructure system according to example embodiments of the present disclosure. As illustrated in FIG. 4, a security integration 400 for a vehicle service infrastructure system can include a VIP gateway 302 (e.g., service provider network edge, etc.), a public platform (e.g., public VIP) 306, and a private platform (e.g., private VIP) 308 as part of a vehicle service infrastructure system, as discussed in regard to FIG. 3. In some implementations, as further illustrated in FIG. 4, a security integration 400 for a vehicle service infrastructure system can include a separate specialized security gateway (e.g., to perform operations of a security integration system) for each vendor as well as the service provider, such as service provider VIP security gateway 402, vendor X VIP security gateway 404, and vendor Y VIP security gateway 404, for example. The vendor specific security gateways (e.g., service provider VIP security gateway 402, vendor X VIP security gateway 404, vendor Y VIP security gateway 404, etc.) can be implemented in front of the public VIP 406 in the request message flow. As similarly described with regard to FIG. 3, vehicles associated with a service provider (e.g., service provider vehicle(s) 322) as well as vehicles and/or clients associated with one or more third-party partners (e.g., vendor X vehicle(s) 332, vendor X server 334, vendor Y vehicle(s) 342, vendor Y server 344, etc.) can communicate with the vehicle service infrastructure system, for example, through VIP gateway 302.

For example, in some implementations, the vendor-specific VIP security gateways (e.g., vendor X VIP security gateway 404, vendor Y VIP security gateway 404, etc.) can be implemented between the VIP gateway 302 and the public VIP 306. In such implementations, when the VIP gateway 302 receives a message from a vendor client system (e.g., vendor X vehicle(s) 332, vendor X server 334, vendor Y vehicle(s) 342, vendor Y server 344, etc.), the VIP gateway 302 forwards the message to the appropriate vendor-specific VIP security gateway (e.g., vendor X VIP security gateway 404, vendor Y VIP security gateway 404, etc.). If the vendor provides for message signing (e.g., vendor X vehicle(s) 332, vendor X server 334, etc.), the vendor-specific VIP security gateway (e.g., vendor X VIP security gateway 404, etc.) can verify the signature of the message and forward the message to the public VIP system to be handled as appropriate. If the vendor does not support message signing (e.g., vendor Y vehicle(s) 342, vendor Y server 344, etc.), the vendor-specific VIP security gateway (e.g., vendor Y VIP security gateway 404, etc.) can request a "stub" device certificate for the client, for example, from a secure storage system (e.g., vault 312) comprised within and/or associated with the VIP, as described with regard to FIG. 3. After obtaining the "stub" device certificate for the client, the vendor-specific VIP security gateway (e.g., vendor Y VIP security gateway 404, etc.) can generate a certificate signing request (CSR) and provide the CSR to a service provider licensing service system (e.g., using SCEP). The service provider licensing service system (e.g., service provider licensing service system 310) identifies that the certificate is associated with a trusted authority and returns an operational certificate and corresponding key to the vendor-specific VIP security gateway (e.g., with the operational certificate comprising a vehicle identity (UUID)

embedded within it). In some implementations, security integration 400 may include a whitelist of authorized third-party vendor clients (e.g., vendor Y vehicle(s) 342, etc.), for example, in a vendor Y vehicle whitelist 408.

When the VIP gateway 302 receives a message from a vehicle associated with the service provider (e.g., service provider vehicle(s) 322), the VIP gateway 302 can provide the message to the service provider VIP security gateway 402, which can then provide the message to the private VIP 308 or the public VIP 306 as appropriate (e.g., based on the type of communication, service requested, etc.).

In some implementations, such as illustrated n FIG. 4, validation, authorization, and signing can be performed at the specialized security gateways (e.g., service provider VIP security gateway 402, vendor X VIP security gateway 404, vendor Y VIP security gateway 404, etc.) before the messages reach the public VIP 306, and as such the public VIP 306 may remain unaware of the validity of the identity of the message sender and act as a proxy to upstream systems (e.g., back-end services, etc.).

Figure 5:
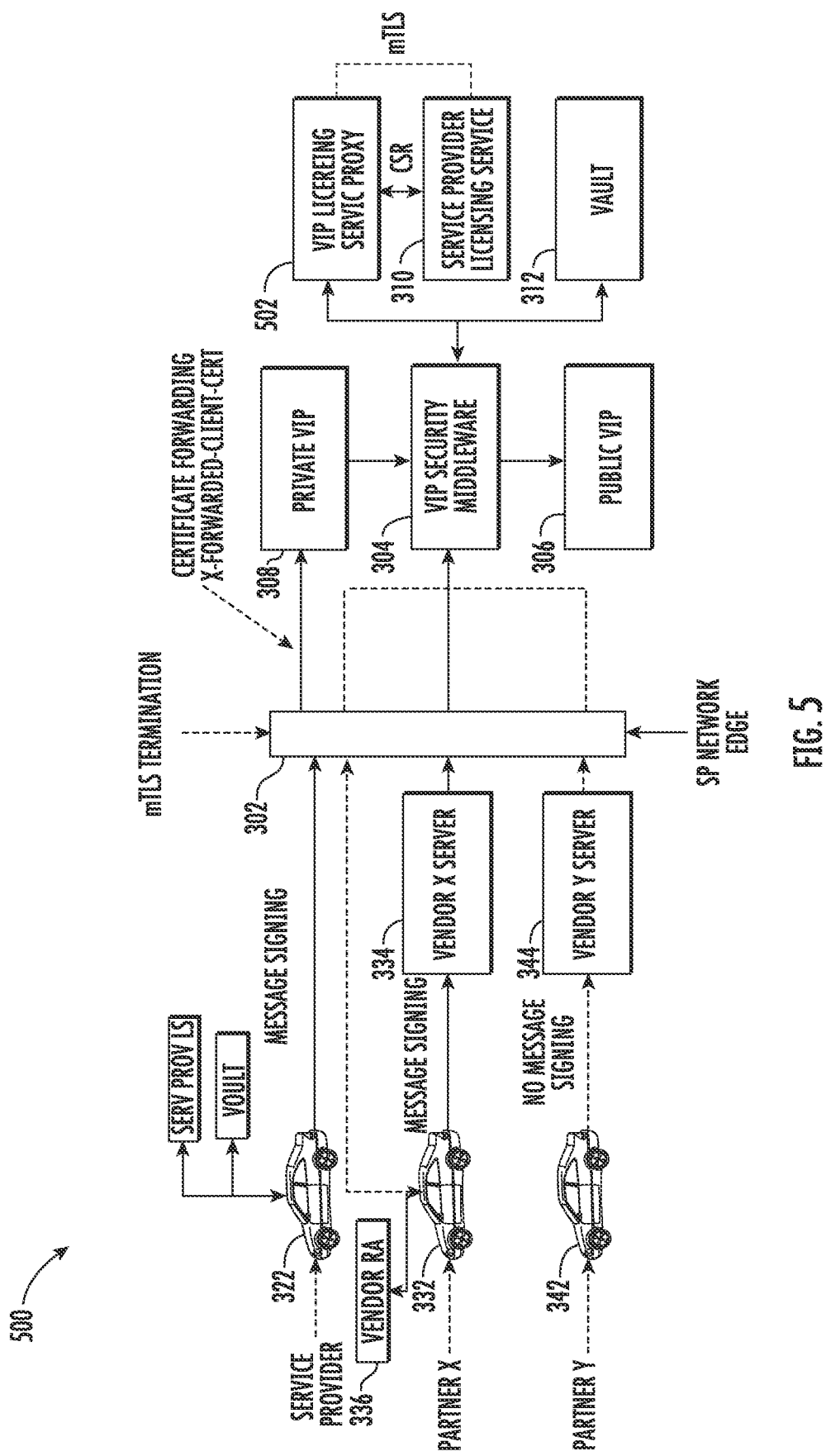
FIG. 5 depicts a third example of security integration for an infrastructure system according to example embodiments of the present disclosure.

FIG. 5 depicts a third example of security integration 500 for a vehicle service infrastructure system according to example embodiments of the present disclosure. For example, FIG. 5 illustrates another example implementation of a VIP security integration system having a multi-layered architecture which can unify approaches to security for first-party clients (e.g., service provider clients) and third-party clients (e.g., vendor clients) and provide for end-to-end security continuously from a vendor vehicle to a service provider infrastructure and vice versa. As illustrated in FIG. 5, a security integration 500 for a vehicle service infrastructure system can include a VIP gateway 302 (e.g., service provider network edge, etc.), a VIP security integration system 304 (e.g., including security middleware layers, etc.), a public platform (e.g., public VIP) 306, and a private platform (e.g., private VIP) 308 as part of a vehicle service infrastructure system, as discussed in regard to FIG. 3. Vehicles associated with a service provider (e.g., service provider vehicle(s) 322) as well as vehicles and/or clients associated with one or more third-party partners (e.g., vendor X vehicle(s) 332, vendor X server 334, vendor Y vehicle(s) 342, vendor Y server 344, etc.) can communicate with the vehicle service infrastructure system, for example, through VIP gateway 302. The operations associated with the components of an implementation as illustrated by security integration 500 can proceed in a similar fashion as that discussed in regard to FIG. 3.

As illustrated in FIG. 5, in some implementations, a vehicle service infrastructure system (e.g., VIP) can include a VIP security integration system 304 (e.g., VIP security middleware, etc.) implemented between a VIP gateway 302 (e.g., service provider network edge, etc.) and a public VIP system (e.g., public VIP 306) to provide for secure communication between client systems (e.g., service provider vehicle(s) 322, vendor X vehicle(s) 332, vendor X server 334, vendor Y vehicle(s) 342, vendor Y server 344, etc.) and the service provider operations systems (e.g., VIP, service provider back-end services, etc.). When the VIP gateway 302 receives a message comprising a client certificate (e.g., TLS certificate, etc.), for example, from a vendor computing system (e.g., vendor X server 334, vendor Y server 344, etc.) and/or vendor vehicle (e.g., vendor X vehicle(s) 332, vendor Y vehicle(s) 342, etc.), the VIP gateway 302 can forward the message to the VIP security integration system 304. The message from the vendor computing system (e.g., vendor X server 334, vendor Y server 344, etc.) can originate from a vehicle associated with the vendor (e.g., vendor X vehicle(s) 332, vendor Y vehicle(s) 342, etc.). The message from the vendor computing system (e.g., vendor X server 334, vendor Y server 344, etc.) and/or vendor vehicle (e.g., vendor X vehicle(s) 332, vendor Y vehicle(s) 342, etc.) can be associated with coordinating implementation of one or more services (e.g., vehicle-based transportation services such as ride-share services, delivery services, courier services, etc.).

The VIP security integration system 304 can determine the vendor identity from the client certificate and obtain vendor specific security configuration data (e.g., security architecture implemented by the vendor, etc.). Based on the vendor specific security configuration data, the VIP security integration system 304 can determine whether the vendor system supports message signing. If the vendor system supports message signing (e.g., vendor X vehicle 332, vendor X server 334), the VIP security integration system 304 can forward signed messages from the client (e.g., vendor X server 334, vendor X vehicle 332) to the public VIP 306. The public VIP 306 can then validate the signature of the signed message before forwarding the message to one or more service provider system clients (e.g., back-end services, etc.) for handling as appropriate. Additionally, in some implementations, as illustrated in FIG. 5, security integration 500 for a vehicle service infrastructure system can include a VIP licensing service proxy 502 and service provider licensing service 310 implemented downstream of the VIP security integration system 304 behind the VIP gateway 302. The VIP licensing service proxy 502 can relay SCEP requests from the VIP security integration system 304 to the service provider licensing service 310. Such implementations can eliminate the need for a third-party vendor to integrate with a licensing service system (e.g., service provider licensing service 310) and can provide clear separation between an external third-party vendor implementation and the service provider infrastructure by standardizing authentication flow and schemes and by removing the need from a third-party vendor to maintain additional communication protocols with the licensing service (e.g., service provider licensing service 310). In addition, such implementations can enable increased flexibility with regard to changing the licensing service (e.g., PKI infrastructure, etc.), changing communication channels and/or protocol definitions, modifying authentication (AuthN) and/or authorization (AuthZ) schemes based on new requirements, and/or the like without requiring third-party vendor migration. In some implementations, the VIP can also abstract and implement better error handling for licensing service integration. In some implementations, the VIP licensing service proxy 502 can translate a service provider protocol to a protocol required by the licensing service. In some implementations, the VIP licensing service proxy 502 can be implemented inside the VIP security integration system 304 and operate to relay SCEP requests to the service provider licensing service 310.

If the vendor system does not support message signing (e.g., vendor Y vehicle 342, vendor Y server 344), the VIP security integration system 304 can request a "stub" device certificate for the client, for example, from a secure storage system, such as vault 312, comprised within the VIP via a service provider licensing service 310 and/or VIP licensing service proxy 502. In some implementations, a "stub" device certificate can be generated (e.g., via service provider licensing service 310, etc.) for a client during a client provision process at the VIP (e.g., via a VIP provision service system) for a vendor system that does not provide vehicle device certificates for message signing (e.g., vendor Y vehicle 342, vendor Y server 344) and the "stub" device certificate can be stored, along with a corresponding private key, in a secure storage system (e.g., vault 312) comprised within the VIP which is associated with the VIP security integration system 304 and/or a service provider licensing service system 310. After obtaining the "stub" device certificate for the client (e.g., vendor Y vehicle 342, etc.), the VIP security integration system 304 can generate a certificate signing request (CSR) and provide the CSR to a service provider licensing service system 310 (e.g., using a certificate issuing protocol such as but not limited to Simple Certificate Enrollment Protocol (SCEP)), for example, via VIP licensing service proxy 502. The service provider licensing service system 310 can identify that the certificate is associated with a trusted authority (e.g., client that is authorized to operate with the service provider infrastructure/VIP) and returns an operational certificate and corresponding key for the client (e.g., vendor Y vehicle 342, etc.) to the VIP security integration system 304. In some embodiments, for example, an operational certificate can include a universally unique identifier (UUID) descriptive of a client/vehicle identity (e.g., vendor Y vehicle 342, etc.) embedded within it. The VIP security integration system 304 can then use the operational certificate to sign messages from the client (e.g., vendor Y vehicle 342, etc.) before forwarding the messages to the public VIP 306. The public VIP 306 can then validate the signature of the signed message before forwarding the message to one or more service provider system clients for handling as appropriate. In some implementations, an operational certificate can grant access to the VIP, for example, via mutual TLS (e.g., server scenario) or can be used to perform a specific action, such as message signing (e.g., vehicle scenario). An operational certificate can be short-lived, for example, issued for 24 hours by a licensing service, and can be used by vehicles and/or vendor server computing systems to communicate with the VIP.

When the VIP gateway 302 receives a message from a vehicle associated with the service provider (e.g., service provider vehicle(s) 322), the VIP gateway can provide the message to the private VIP 308 or the public VIP 306 as appropriate (e.g., based on the type of communication, services requested, etc.). In some implementations, licensing for autonomous vehicles associated with the service provider (e.g., service provider vehicle(s) 322) may be initiated upon a secure start of the vehicle. For example, upon a secure start using credentials stored in a secure storage system (e.g., on-board the vehicle), the service provider vehicle 322 may generate a CSR and provide the CSR to the service provider licensing service 310 to obtain operational certificates and the operational certificate private keys.

Figure 6:
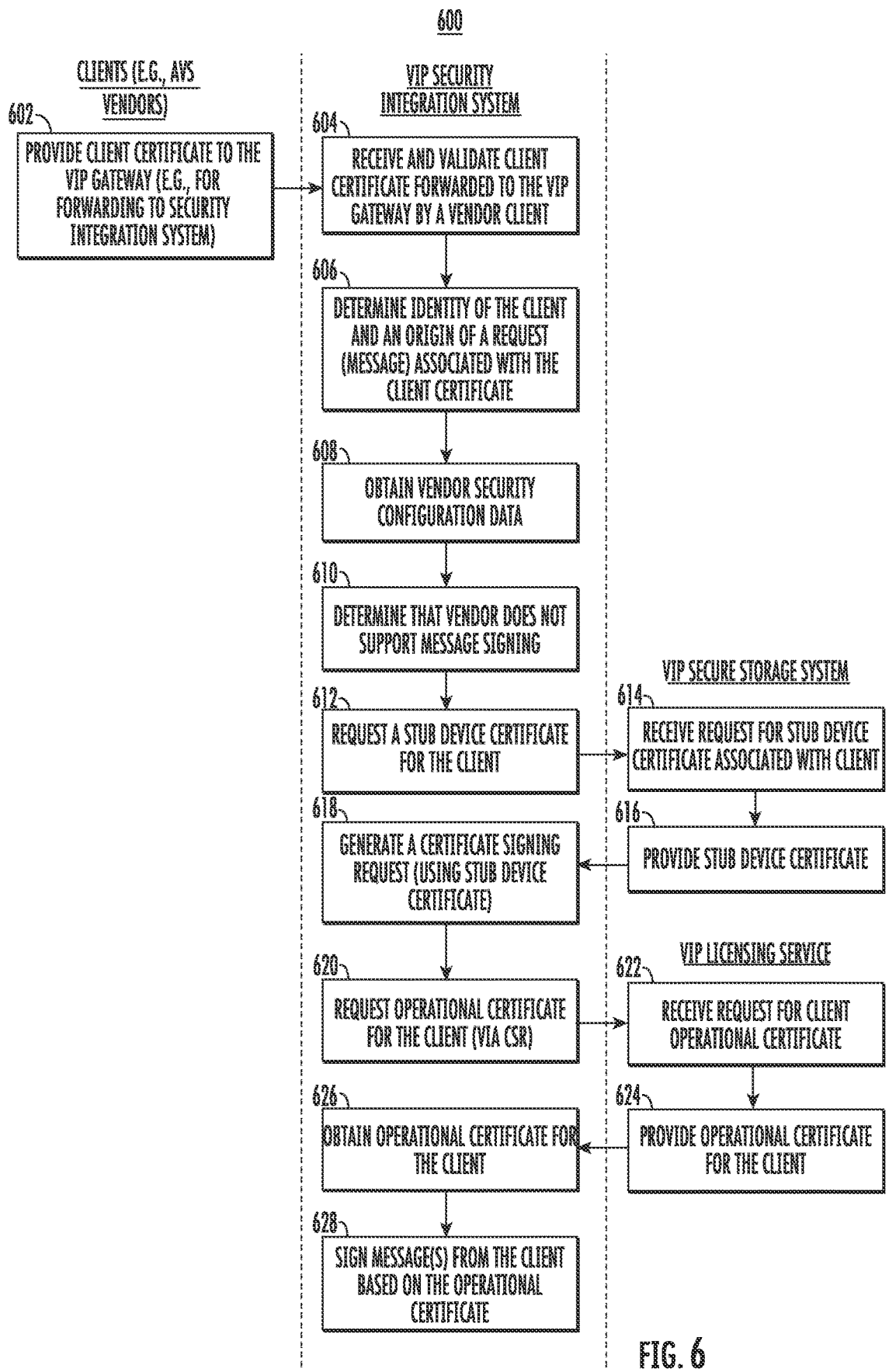
FIG. 6 depicts a flow chart of example operations for infrastructure system security integration according to example embodiments of the present disclosure.

FIG. 6 depicts a flow chart of an example method for infrastructure system security integration according to example embodiments of the present disclosure. One or more portion(s) of the operations of method 600 can be implemented by one or more computing systems that include, for example, a vehicle computing system (e.g., vehicle computing system 112, etc.), one or more portions of an operations computing system (e.g., operations computing system 104, etc.), one or more remote computing systems (e.g., remote computing device 106, remote computing system 720, etc.), and/or one or the like. Each respective portion of the method 600 can be performed by any (or any combination) of the computing device(s) of the respective computing system. Moreover, one or more portion(s) of the method 600 can be implemented as an algorithm on the hardware components of the device(s) described herein (e.g., as in FIGS. 1, 2, 7, and 8), for example, to facilitate infrastructure system security integration. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, method 600 includes a client (e.g., vehicles 322, 332, or 342 of FIG. 3, vehicles 208, 214, or 216 of FIG. 2, etc.) providing a message including a client certificate (e.g., TLS certificate, etc.) to a service provider platform gateway associated with a service provider infrastructure (e.g., for forwarding to security integration system), such as for example, VIP gateway 302 of FIG. 3. For example, a VIP can facilitate secure, bidirectional communications between autonomous vehicles and/or server computing systems associated with a plurality of entities (e.g., clients) and a service provider infrastructure such as, for example, a service provider's operations system (e.g., including one or more back-end services, etc.). The messages provided from the client can be services-related communication(s) (e.g., trip services, routing services, etc.) being sent to the service provider infrastructure to facilitate performance of a vehicle service (e.g., a transportation service (e.g., rideshare service), a courier service, a delivery service, etc.). For example, in some implementations, services-related communications can include data indicative of vehicle availability for a service assignment, supply positioning data, vehicle status, vehicle location, routing requests, transactional data, services log data, and/or the like. At 604, method 600 includes a security integration system (e.g., VIP security integration system 304 of FIG. 3, etc.) receiving and validating the client certificate forwarded to the platform gateway (e.g., VIP gateway 302 of FIG. 3, gateway 222 of FIG. 2, etc.) by the client (e.g., vehicles 322, 332, or 342 of FIG. 3, vehicles 208, 214, or 216 of FIG. 2, etc.).

At 606, method 600 includes the security integration system (e.g., VIP security integration system 304 of FIG. 3, etc.) determining the identity of the client (e.g., vehicles 322, 332, or 342 of FIG. 3, vehicles 208, 214, or 216 of FIG. 2, etc.) and an origin of a request (message) associated with the received client certificate. For example, in some implementations, after validating the client certificate (e.g., TLS certificate, etc.), the security integration system can determine the identity of the vendor (e.g., name, unique identifier, etc.) that is associated the client certificate (e.g., TLS certificate, etc.) and the particular vendor client (e.g., server, vehicle computing system, etc.) that sent the message (e.g., with client certificate) to the VIP (e.g., VIP gateway, VIP security integration system, etc.), for instance based on data provided in the client certificate and/or the message.

At 608, method 600 includes the security integration system (e.g., VIP security integration system 304 of FIG. 3, etc.) obtaining vendor security configuration data. The security integration system can obtain the vendor security configuration data based on the vendor identity determined at 606. For example, the security integration system can obtain, store, and/or retrieve vendor-specific security configuration data for each vendor authorized to communicate with the service provider infrastructure. The vendor security configuration data can include information associated with the security configuration of the vendor system (e.g., regarding the system security architecture established by the vendor, encryption used by vendor, whether vendor system provides for message signing, and/or the like), and for example, indicate if the vendor supports message signing and/or the like.

At 610, method 600 includes the security integration system determining that the identified vendor does not support message signing. At 612, method 600 includes the security integration system generating a request for a stub device certificate for the vendor client in response to determining that the identified vendor does not support message signing. The security integration system can provide the request for a stub device certificate to a secure storage system associated with the service provider platform and/or the security integration system (e.g., secure storage system 312 of FIG. 3, etc.).

At 614, method 600 includes the secure storage system receiving the request for a stub device certificate associated with the vendor client from the security integration system. For example, a stub device certificate can be generated for a client during a client provision process at the service provider platform (e.g., by a VIP provision service system) for a vendor system that does not provide vehicle device certificates for message signing (e.g., the vendor system does not support message signing) and the stub device certificate can be stored, along with a corresponding private key, in a secure storage system comprised within the VIP which is associated with the VIP security integration system and/or a service provider licensing service system. At 616, method 600 includes the secure storage system providing the stub device certificate for the vendor client to the security integration system.

At 618, method 600 includes the security integration system generating a certificate signing request based on the received stub device certificate for the vendor client. For example, after obtaining the stub device certificate for the client, the security integration system can generate a certificate signing request (CSR) and provide the CSR to a service provider licensing service, for example, using a certificate issuing protocol such as, but not limited to Simple Certificate Enrollment Protocol (SCEP). At 620, method 600 includes the security integration system providing the CSR to the service provider licensing service to request an operational certificate for the client.

At 622, method 600 includes the service provider licensing service receiving the CSR with the request for client operational certificate from the security integration system. At 624, method 600 includes the service provider licensing service providing the operational certificate for the vendor client to the security integration system. For example, the service provider licensing service can identify that the certificate is associated with a trusted authority (e.g., a vendor client that is authorized to operate with the service provider infrastructure/VIP) and returns an operational certificate and corresponding key for the client to the security integration system. In some embodiments, for example, an operational certificate can include a universally unique identifier (UUID) descriptive of a client/vehicle identity embedded within it.

At 626, method 600 includes the security integration system obtaining the operational certificate for the client from the service provider licensing service. At 628, method 600 includes the security integration system signing message(s) from the client based on the operational certificate and providing the signed messages to the service provider public platform (e.g., public VIP 306 of FIG. 3, etc.). The public platform (e.g., public VIP 306, etc.) can then validate the signature of the signed message before forwarding the message to one or more service provider system clients for handling as appropriate.

Figure 7:
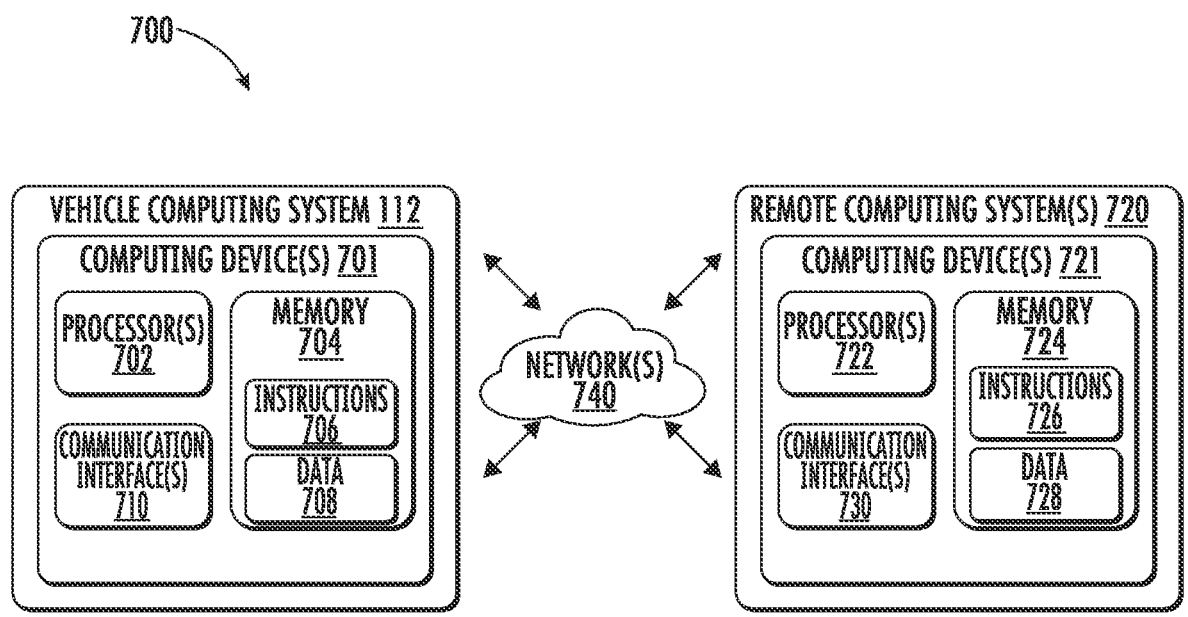
FIG. 7 depicts a block diagram of an example computing system according to example embodiments of the present disclosure.

FIG. 7 depicts a block diagram of an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. As one example, the example system 700 can include the vehicle computing system 112 of the autonomous vehicle 102 and a remote computing system 720 (e.g., operations computing system, other computing system, etc. that is remote from the vehicle 102/vehicle computing system 112) that can be communicatively coupled to one another over one or more network(s) 740. The remote computing system 720 can be and/or include the operations computing system 104 and/or remote computing system 106 of FIG. 1, as an example. The remote computing system 720 can be associated with a central operations system and/or an entity associated with the vehicle 102 such as, for example, a vehicle owner, vehicle manager, fleet operator, service provider, etc. For instance, the remote computing system 720 can be or otherwise include the remote computing system 104 described herein.

The computing device(s) 701 of the vehicle computing system 112 can include processor(s) 702 and at least one memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, magnetic disks, data registers, etc., and combinations thereof.

The memory 704 can store information that can be accessed by the one or more processors 702. For instance, the memory 704 (e.g., one or more non-transitory computer-readable storage mediums, memory devices) can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 102 can store instructions 706 that when executed by the one or more processors 702 cause the one or more processors 702 (e.g., in the vehicle computing system 112) to perform operations such as any of the operations and functions of the computing device(s) 701 and/or vehicle computing system 112, any of the operations and functions for which the vehicle computing system 112 is configured, and/or any other operations and functions described herein.

The memory 704 can store data 708 that can be obtained (e.g., received, accessed, written, manipulated, created, generated, etc.) and/or stored. The data 708 can include, for instance, services data (e.g., assignment data, route data, user data, etc.), sensor data, map data, perception data, prediction data, motion planning data, object states and/or state data, object motion trajectories, log data, vendor data, security configuration data, certificate data, and/or other data/information as described herein. In some implementations, the computing device(s) 701 can obtain data from one or more memories that are remote from the autonomous vehicle 102.

The computing device(s) 701 can also include a communication interface 710 used to communicate with one or more other system(s) (e.g., the remote computing system 720). The communication interface 710 can include any circuits, components, software, etc. for communicating via one or more networks (e.g., network(s) 740). In some implementations, the communication interface 710 can include, for example, one or more of a communications controller, receiver, transceiver, transmitter, port, conductors, software, and/or hardware for communicating data.

The remote computing system 720 can include one or more computing device(s) 721. The computing device(s) 721 can include one or more processors 722 and at least one memory 724. The one or more processors 722 can be any suitable processing device (e.g., a processor core, a microprocessor, an ASIC, a FPGA, a controller, a microcontroller, etc.) and can be one processor or a plurality of processors that are operatively connected. The memory 724 can include one or more tangible, non-transitory computer-readable storage media, such as RAM, ROM, EEPROM, EPROM, one or more memory devices, flash memory devices, data registers, etc., and combinations thereof.

The memory 724 can store information that can be accessed by the one or more processors 722. For instance, the memory 724 (e.g., one or more tangible, non-transitory computer-readable storage media, one or more memory devices, etc.) can include computer-readable instructions 726 that can be executed by the one or more processors 722. The instructions 726 can be software written in any suitable programming language or can be implemented in hardware. Additionally, or alternatively, the instructions 726 can be executed in logically and/or virtually separate threads on processor(s) 722.

For example, the memory 724 can store instructions 726 that when executed by the one or more processors 722 cause the one or more processors 722 to perform operations such as any of the operations and functions of the operations computing system 104, the remote computing system 106, the remote computing system 720 and/or computing device(s) 721 or for which any of these computing systems are configured, as described herein, and/or any other operations and functions described herein.

The memory 724 can store data 728 that can be obtained and/or stored. The data 728 can include, for instance, services data (e.g., assignment data, route data, user data etc.), data associated with autonomous vehicles (e.g., vehicle data, maintenance data, ownership data, sensor data, map data, perception data, prediction data, motion planning data, object states and/or state data, object motion trajectories, log data, etc.), third-party entity data, inventory data, scheduling data, log data, attribute data, security configuration data, certificate data, integration data, user data, and/or other data/information as described herein. In some implementations, the computing device(s) 721 can obtain data from one or more memories that are remote from the remote computing system 720.

The computing device(s) 721 can also include a communication interface 730 used to communicate with one or more other system(s) (e.g., the vehicle computing system 112, remote computing systems, etc.). The communication interface 730 can include any circuits, components, software, etc. for communicating via one or more networks (e.g., network(s) 740). In some implementations, the communication interface 730 can include, for example, one or more of a communications controller, receiver, transceiver, transmitter, port, conductors, software, and/or hardware for communicating data.

The network(s) 740 can be any type of network or combination of networks that allows for communication between devices. In some embodiments, the network(s) 740 can include one or more of a local area network, wide area network, the Internet, secure network, cellular network, mesh network, peer-to-peer communication link, and/or some combination thereof, and can include any number of wired or wireless links. Communication over the network(s) 740 can be accomplished, for instance, via a communication interface using any type of protocol, protection scheme, encoding, format, packaging, etc.

Figure 8:
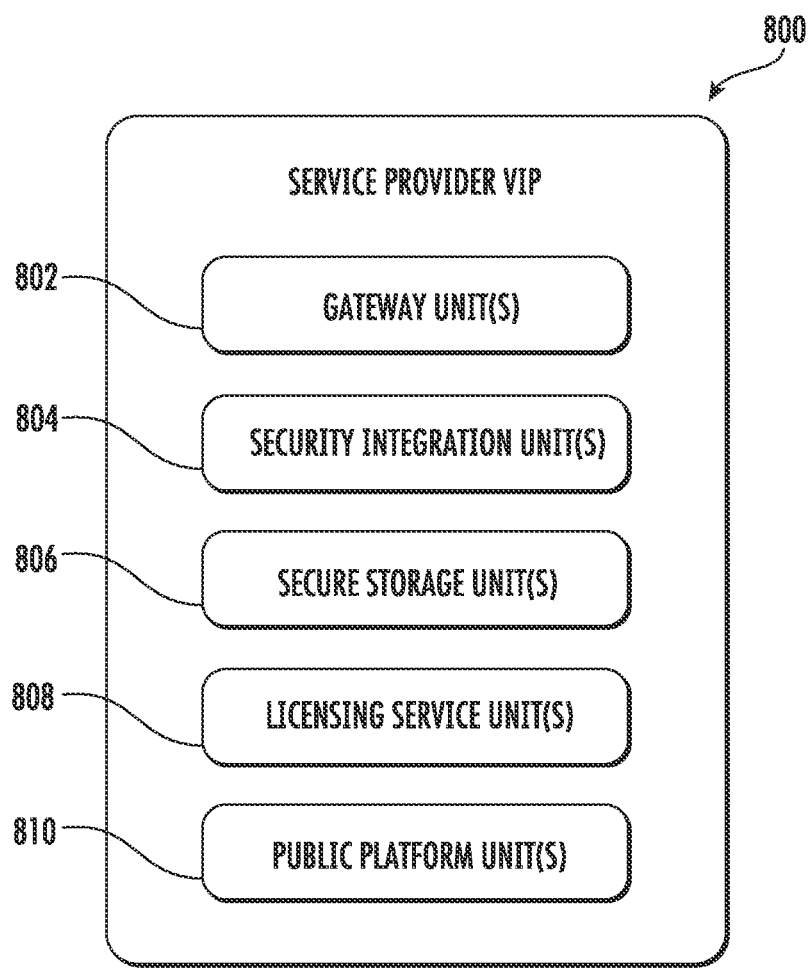
FIG. 8 depicts an example infrastructure system according to example embodiments of the present disclosure.

Various means can be configured to perform the methods and processes described herein. For example, FIG. 8 depicts an example infrastructure system 800 according to example embodiments of the present disclosure. The system 800 can include gateway unit(s) 802, security integration unit(s) 804, secure storage unit(s) 806, licensing service unit(s) 808, public platform unit(s) 810, and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 600) and/or other operations described herein can be implemented as such algorithm(s). For instance, the means (e.g., gateway unit(s) 802, etc.) can be configured to obtain messages generated by a client (e.g., service provider vehicle(s) 208, 322, vendor vehicle(s) 241, 216, 332, 342, etc.) to request services from a service provider infrastructure. The means (e.g., gateway unit(s) 802, etc.) can be configured to forward the message(s) to security integration unit(s).

The means (e.g., security integration unit(s) 804) can be configured to receive the messages (and associated client certificate(s)), for example, from the gateway unit(s) 802 and validate the client certificate(s) (e.g., TLS certificate, etc.). The means (e.g., security integration unit(s) 804) can be configured to determine the identity of a vendor and the origin of the message based on the client certificate. The means (e.g., security integration unit(s) 804) can be configured to obtain specific vendor security configuration data based on the vendor identity, for example, to determine if the vendor supports message signing, etc.

The means (e.g., security integration unit(s) 804) can be configured to determine how to handle messages based on the vendor security configuration data. For example, if it is determined that the vendor supports message signing, the means (e.g., security integration unit(s) 804) can be configured to provide the signed messages from the client to the public platform unit(s) 810. Alternatively, if it is determined that the vendor does not support message signing, the means (e.g., security integration unit(s) 804) can be configured to request a stub device certificate for the client, for example, from a secure storage unit 806. The means (e.g., secure storage unit(s) 806) can be configured to store a stub device certificate, along with a corresponding private key, for a vendor client that does not support message signing. For example, a stub device certificate, and corresponding private key, can be generated during provisioning of the client and stored by the secure storage unit(s) 806. The means (e.g., secure storage unit(s) 806) can be configured to retrieve and return a stored stub device certificate, for example, based on a request from a security integration unit 804.

The means (e.g., security integration unit(s) 804) can be configured to receive a stub device certificate for a client and generate a certificate signing request (CSR) based on the stub device certificate. The means (e.g., security integration unit(s) 804) can be configured to provide the CSR to a licensing service unit. The means (e.g., licensing service unit(s) 808) can be configured to identify that a certificate is associated with a trusted authority (e.g., client that is authorized to operate with a service provider infrastructure) and return an operational certificate and corresponding key for the client to the security integration unit. The means (e.g., security integration unit(s) 804) can be configured to receive the operational certificate and use the operational certificate to sign messages from the client before forwarding the messages to the public platform unit(s).

The means (e.g., public platform unit(s) 810) can be configured to receive the signed message(s) and validate the signature of the signed message(s) before forwarding the message(s) to one or more service provider system clients (e.g., back-end services) for handling as appropriate. For example, the public platform unit(s) 810 can be configured to provide messages generated by a client (e.g., service provider vehicle(s) 208, 322, vendor vehicle(s) 241, 216, 332, 342, etc.) to one or more back-end services associated with a service provider infrastructure to facilitate performance of a vehicle service (e.g., a transportation service (e.g., rideshare service), a courier service, a delivery service, etc.).

These described functions of the means are provided as examples and are not meant to be limiting. The means can be configured for performing any of the operations and functions described herein.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A communication infrastructure, comprising:
   a vehicle integration platform comprising at least one processor programmed to facilitate message communication among a plurality of clients; and
   a security integration system comprising at least one processor programmed to perform operations comprising:
   receiving a client certificate forwarded to the vehicle integration platform, wherein the client certificate is associated with a client of the plurality of clients, the client being an autonomous vehicle associated with a first autonomous vehicle vendor platform;
   generating a certificate signing request associated with the client certificate based in part on an identity of the client;
   obtaining an operational certificate for the client based in part on the certificate signing request, the operational certificate for the client describing a vendor identity associated with the client, and vendor specific security information associated with the vendor identity, the vendor identity indicating the first autonomous vehicle vendor platform;
   signing an instruction message for the client based on the operational certificate and the vendor specific security information associated with the vendor identity; and
   causing the client to execute a transportation service using a vehicle autonomy system of the autonomous vehicle based on the signed instruction message.

2. The communication infrastructure of claim 1, wherein the security integration system is configured to determine whether the first autonomous vehicle vendor platform supports message signing based on the vendor specific security information.

3. The communication infrastructure of claim 2, wherein the security integration system is configured to forward signed messages from the client to the vehicle integration platform when the security integration system determines that the first autonomous vehicle vendor platform supports message signing based on the vendor specific security information.

4. The communication infrastructure of claim 2, wherein the security integration system is further configured to:
   obtain a stub device certificate for the client when the security integration system determines that the first autonomous vehicle vendor platform does not support message signing based on the vendor specific security information.

5. The communication infrastructure of claim 4, wherein the stub device certificate is generated for the client during provisioning of the client within the vehicle integration platform.

6. The communication infrastructure of claim 4, wherein the stub device certificate is obtained from a secure storage system associated with the vehicle integration platform.

7. The communication infrastructure of claim 1, wherein the operational certificate is established to provide client authentication with the vehicle integration platform for a predetermined time period.

8. The communication infrastructure of claim 1, wherein the security integration system is part of the vehicle integration platform.

9. The communication infrastructure of claim 1, wherein the security integration system is in front of the vehicle integration platform.

10. The communication infrastructure of claim 1, wherein the plurality of clients comprise a plurality of autonomous vehicles respectively associated with one or more vendors and one or more system clients associated with an entity.

11. A computer-implemented method for facilitating secure communication between a client and a vehicle integration platform computing system, the method comprising:
  receiving, by a vehicle integration platform computing system comprising one or more computing devices, a client certificate forwarded to the vehicle integration platform computing system, wherein the client certificate is associated with the client, the client being an autonomous vehicle associated with a first autonomous vehicle vendor platform;
  generating, by the vehicle integration platform computing system, a certificate signing request associated with the client certificate based in part on an identity of the client;
  obtaining, by the vehicle integration platform computing system, an operational certificate for the client based in part on the certificate signing request, the operational certificate for the client describing a vendor identity associated with the client, and vendor specific security information associated with the vendor identity, the vendor identity indicating the first autonomous vehicle vendor platform;
  signing, by the vehicle integration platform computing system, an instruction message for the client based on the operational certificate and the vendor specific security information associated with the vendor identity; and
  causing the client to execute a transportation service using a vehicle autonomy system of the autonomous vehicle based on the signed instruction message.

12. The computer-implemented method of claim 11, comprising determining whether the first autonomous vehicle vendor platform associated with the vendor identity supports message signing based on the vendor specific security information.

13. The computer-implemented method of claim 12, comprising forwarding signed messages from the client to the vehicle integration platform computing system when the first autonomous vehicle vendor platform is determined to support message signing based on the vendor specific security information.

14. The computer-implemented method of claim 12, comprising obtaining a stub device certificate for the client when the first autonomous vehicle vendor platform is determined not to support message signing based on the vendor specific security information.

15. A vehicle integration platform computing system, comprising:
  one or more processors; and
  one or more memories including instructions that, when executed by the one or more processors, cause the one or more processors to perform operations, the operations comprising:
  receiving a client certificate forwarded to the vehicle integration platform computing system, wherein the client certificate is associated with a client, the client being an autonomous vehicle associated with a first autonomous vehicle vendor platform;
  determining a vendor identity associated with the client from the client certificate, the vendor identity indicating the first autonomous vehicle vendor platform;
  obtaining vendor specific security information associated with the vendor identity;
  generating a certificate signing request associated with the client certificate based in part on the vendor identity;
  obtaining an operational certificate for the client based in part on the certificate signing request;
  signing an instruction message for the client based on the operational certificate and the vendor specific security information associated with the vendor identity; and
  causing the client to execute a transportation service using a vehicle autonomy system of the autonomous vehicle based on the signed instruction message.

16. The vehicle integration platform computing system of claim 15, the operations comprising:
  determining that the first autonomous vehicle vendor platform does not support message signing based on the vendor specific security information; and
  obtaining a stub device certificate for the client.

17. The vehicle integration platform computing system of claim 15, wherein the client comprises an autonomous vehicle associated with the first autonomous vehicle vendor platform.

* * * * *